United States Patent
Splett

(10) Patent No.: US 7,020,473 B2
(45) Date of Patent: Mar. 28, 2006

(54) METHOD FOR FINDING THE POSITION OF A SUBSCRIBER IN A RADIO COMMUNICATIONS SYSTEM

(75) Inventor: Armin Splett, Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 192 days.

(21) Appl. No.: 10/773,364

(22) Filed: Feb. 9, 2004

(65) Prior Publication Data

US 2004/0157623 A1 Aug. 12, 2004

(30) Foreign Application Priority Data

Feb. 7, 2003 (DE) ................. 103 05 091
Feb. 7, 2003 (EP) ................. 03002821

(51) Int. Cl.
*H04Q 7/20* (2006.01)

(52) U.S. Cl. .................................. 455/456.1
(58) Field of Classification Search ...... None
See application file for complete search history.

(56) References Cited

U.S. PATENT DOCUMENTS 5,526,357 A   6/1996   Jandrell
6,490,456 B1  12/2002  Bogdan et al.

(Continued)

FOREIGN PATENT DOCUMENTS

| EP | 0851239 A1 | 7/1998 |
|---|---|---|
| EP | 1193990 A1 | 4/2002 |
| WO | WO97/44970 | 11/1997 |
| WO | WO99/39219 | 8/1999 |
| WO | WO01/89254 A1 | 11/2001 |

OTHER PUBLICATIONS

3GPP TS 25.215 V.4.5.0 (Sep. 2002), Technical Specification, 3rd Generation Partnership Project, Technical Specification Group Radio Access Network, Physical Layer—Measurements (FDD), pp. 1-18.

(Continued)

*Primary Examiner*—Nguyen T. Vo
*Assistant Examiner*—Julie E Stein
(74) *Attorney, Agent, or Firm*—Staas & Halsey LLP

(57) ABSTRACT

A method for finding the position of a subscriber in a radio communications system combines transmission signals from subscribers to form a transmission sum signal, which is passed by cables from a base station to at least two antenna devices for transmission. Received signals from subscribers are received via the antenna devices and are combined to form a received sum signal, which is passed by cables to the base station. Each individual antenna device is associated with an individual area for the radio supply for the subscribers there. Cables lengths, which are used for signal transmission, for each antenna device are chosen individually such that a round trip delay time measurement which is based on the transmission signal and received signal of a sought subscriber is used to determine an antenna device via which the received signal sought subscriber is received. The position of the sought subscriber is determined via the area which is supplied by radio and is associated with the determined antenna device.

9 Claims, 1 Drawing Sheet

U.S. PATENT DOCUMENTS

| | | |
|---|---|---|
| 2001/0053699 A1 | 12/2001 | McCrady et al. |
| 2002/0094820 A1 | 7/2002 | Keranen et al. |
| 2002/0160787 A1 | 10/2002 | Chen et al. |
| 2003/0017832 A1 | 1/2003 | Anderson et al. |
| 2003/0216144 A1* | 11/2003 | Roese et al. ............. 455/456.1 |
| 2004/0102196 A1* | 5/2004 | Weckstrom et al. ...... 455/456.1 |
| 2004/0204112 A1* | 10/2004 | Caci ........................ 455/562.1 |

OTHER PUBLICATIONS

3GPP TS 25.133 V.4.6.0 (Sep. 2002), Technical Specification, 3rd Generation Partnership Project, Technical Specification Group Radio Access Network, Requirements for Support of Radio Resource Management (FDD), pp. 1-6 and 72 and 73.

* cited by examiner

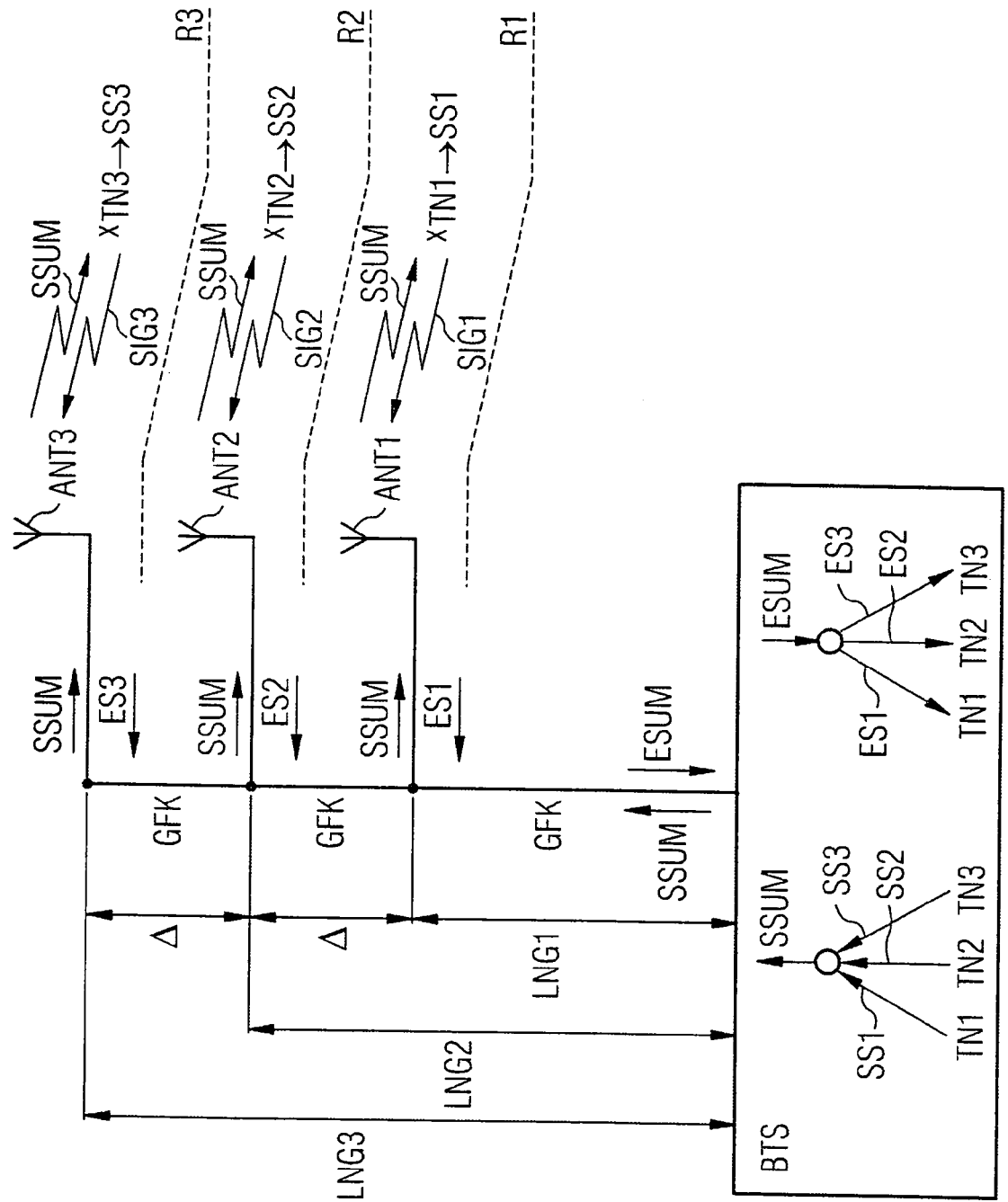

METHOD FOR FINDING THE POSITION OF A SUBSCRIBER IN A RADIO COMMUNICATIONS SYSTEM

CROSS REFERENCE TO RELATED APPLICATIONS

This application is based on and hereby claims priority to German Application No. 10305091.4 filed Feb. 7, 2003 and European Application No. 03002821.1 filed Feb. 7, 2003, the contents of which are hereby incorporated by reference.

BACKGROUND OF THE INVENTION

One possible aspect of the invention relates to a method for finding the position of a subscriber in a radio communications system.

In radio communications systems, arrangements with base stations and antenna devices are known, in which transmission signals from two or more subscribers are combined to form a transmission sum signal, and this transmission sum signal is passed by cables from the base station to at least two spatially distributed antenna devices for transmission. On the other hand, radio received signals from subscribers, which are received via the antenna devices, are combined to form a received sum signal, which is transmitted by cables to the base station.

When using glass fiber cables for cable transmission, the sum signals mentioned above are in general produced by analog modulation of a semiconductor laser.

Furthermore, methods are known for finding the position of a subscriber in a mobile radio communications system, which methods find the position of a subscriber via transceivers, with the aid of delay time measurements. Examples of this are position-finding methods in a GSM mobile radio system, based on the so-called "timing advance mechanism".

However, a method such as this cannot be used in the radio communications system as described above, in which base stations are used with spatially distributed antenna devices, since multipath propagation and the reception situation mean that only ambiguous positions can be found. These ambiguities could be minimized only by using costly additional transceivers.

SUMMARY OF THE INVENTION

One possible object of the present invention is therefore to specify a cost-effective method for finding the position of a sought subscriber in a radio communications system, in which a base station is associated with at least two antenna devices for signal reception.

In the method proposed by the inventor, glass fiber cables are preferably used for signal transmission—both at the transmission end and at the reception end. Owing to the very low attenuation levels, the individual cable lengths, and the differences which can be found between the cable lengths can be chosen such that ambiguities in the delay time measurement to be carried out can be avoided, provided that the signal quality is good.

In the method, the position-finding process is based on a so-called "round trip" delay time measurement as is described, for example, in "$3^{rd}$ Generation Partnership Project; Technical Specification Group Radio Access Network; Physical Layer—Measurements (FDD), Release 4", 3GPP TS 25.215, v4.5.0 (2002–09), section 5.2.8, or in "$3^{rd}$ Generation Partnership Project; Technical Specification Group Radio Access Network; Requirements for Support of Radio Resource Management (FDD), Release 4", 3GPP TS 25.133, v4.6.0 (2002–09), section 5.2.8, section 9.2.8.

In this case, a subscriber-specific signal is transmitted, for example, from a base station to a subscriber, from where a subscriber signal is transmitted back for acknowledgement purposes to the base station. In the case of a "round trip" delay time measurement, the overall delay time of these signals between the base station and the subscriber is determined.

BRIEF DESCRIPTION OF THE DRAWINGS

These and other objects and advantages of the present invention will become more apparent and more readily appreciated from the following description of the preferred embodiments, taken in conjunction with the accompanying drawing of which the FIGURE shows a base station BTS with spatially distributed antenna devices ANT1 to ANT3 for carrying out the position-finding process according to one aspect of the invention.

In the following text, glass fiber cables GFK are used for signal transmission between the base station BTS and the three antenna devices ANT1 to ANT3.

In the base station BTS, and transmission signals SS1 from a first subscriber TN1 are combined with a transmission signal SS2 from a second subscriber TN2 and with a transmission signal SS3 from a third subscriber TN3 to form a transmission sum signal SSUM. The transmission sum signal SSUM is passed via a glass fiber cable GFK to all three-antenna devices ANT1 to ANT3 for transmission.

In this case, a first antenna device ANT1, for example in an indoor radio communications system, is assigned a first area R1 of a building G for its radio supply, in which the first subscriber TN1 is located. In a corresponding manner, a second and a third antenna device ANT2 and ANT3, respectively, are assigned to a second and a third area R2 and R3, respectively, for providing the radio supply to the second and third subscriber TN2 and TN3.

The transmission sum signal SSUM which is transmitted via the antenna devices ANT1 to ANT3 is received by the subscribers TM1 to TM3, and the transmission signal SS1 to SS3 which is intended for the respective subscriber TN1 to TN3 is determined on a subscriber-specific basis from the transmission sumsignal SSUM.

In a corresponding manner, signals SIG1 to SIG3 which are transmitted by the subscribers TN1 to TN3 are received as the received signals ES1 to ES3 via the respective antenna devices ANT1 to ANT3 which are associated with the subscribers TN1 to TN3, and are combined to form a received sum signal ESUM. The received sum signal is in turn passed via a glass fiber cable GFK to the base station BTS, for further processing.

Both the transmission-end and the reception-end sum signal transmission are carried out particularly advantageously with the aid of a common connecting cable.

Individual cable lengths LNG1 to LNG3 are now chosen for each individual antenna device ANT1 to ANT3 such that, based on a round trip delay time measurement which is carried out on a subscriber-specific basis, it is possible to uniquely determine an antenna device ANT1 to ANT3 which is associated with the respective subscriber TN1 to TN3.

Unique determination is possible, for example, by choosing a length difference $\Delta(i)$ between individual cable lengths LNG(i+1) and LNG(i) of adjacent antenna devices ANT(i+1) and ANT(i) using the following formulae:

$$\Delta = LNG(i+1) - LNG(i) \geq Const, \text{ where}$$

$$Const = r*v/c$$

where:
i is a sequential variable to identify a cable length LNG which is associated with an i-th antenna device,
r is the range of a radio supply area,
v=2*10E8 m/s is the glass fiber group velocity, and
c=3*10E8 m/s is the group velocity in air.

By way of example, the cable length LNG(i) of an i-th cable is chosen to be:

$$LNG(i) = i*Const$$

When the signal delay time t is:

$$2*i*Const/v < t < 2*(i+1)*Const/v$$

ambiguities are avoided in the delay time measurement to be carried out, and a subscriber can be uniquely associated with an i-th antenna device.

On the assumption that the maximum cell size, as the range of an antenna device, is, for example, r=300 m, this means that, on the basis of the above formula for the supply line cables for adjacent antenna devices, the minimum required length difference is:

$$\Delta(i) = LNG(i+1) - LNG(i) \geq Const$$

$$\Delta(i) \geq 200 \text{ m}.$$

A glass fiber has typical attenuation levels of about 0.2 dB/km, so that the laying of additional cable lengths does not involve any additional attenuation problem.

A glass fiber cable path with the following individual supply line length LNG1 is chosen for the first antenna device ANT1:

$$LNG1 = 600 \text{ m}$$

Glass fiber cable paths with the individual supply line lengths LNG2 and LNG3 for the second and third antenna devices ANT2, ANT3 are as follows:

$$LNG3 = LNG2 + \Delta = 1000 \text{ m}$$

$$LNG2 = LNG1 + \Delta = 800 \text{ m}.$$

A round trip delay time measurement is carried out, on a representative basis, for the first subscriber TN1, and, based on the delay time differences which are caused by the length differences between the glass fiber cable paths, the first antenna device ANT1 is determined to be the receiving antenna that is associated with the first subscriber TN1.

The result of this is that the area R1 which is associated with the first antenna device ANT1 for radio supply is determined to be the position of the first subscriber TN1.

Distributed antenna devices are typically used for the supply for so-called Piko radio cells within an indoor radio communications system.

the invention has been described in detail with particular reference to preferred embodiments thereof an examples, but it will be understood that variations and modifications can be effected within the spirit and scope of the invention.

What is claimed is:

1. A method for finding the position of a subscriber in a radio communications system, comprising:
combining transmission signals from subscribers to form a transmission sum signal, which is passed by cables from a base station to at least two antenna devices for transmission;
combining received signals which are received from respective subscribers via the at least two antenna devices, the received signals being combined to form a received sum signal, which is passed by cables to the base station;
associating each individual antenna device with an individual area for radio communication with subscribers within the area;
individually choosing cable lengths, which are used for signal transmission, for each antenna device;
measuring a round trip delay time for the transmission signal and the received signal of a sought subscriber using the individually chosen cable lengths;
determining which antenna device originated the received signal of the sought subscriber based on the round trip delay time; and
determining the position of the sought subscriber to be the area associated with the antenna device which originated the received signal.

2. The method as claimed in claim 1, wherein the cable lengths are provided by an optical connecting cable.

3. The method as claimed in claim 1, wherein the cable lengths are provided by a glass fiber cable.

4. The method as claimed in claim 1, wherein the cable lengths are chosen to have cable length differences $\Delta$ between cables associated with adjacent antenna devices, and wherein the cable length differences $\Delta$ are determined using the formulae:

$$\Delta = LNG(i+1) - LNG(i) \geq Const, \text{ where}$$

$$Const = r*v/c$$

where:
i is a sequential variable to identify a cable length LNG which is associated with an i-th antenna device,
r is the range of radio communication for an individual antenna device,
v=2*10E8 m/s is the glass fiber group velocity, and
c=3*10E8 m/s is the group velocity in air.

5. The method as claimed in claim 1, wherein
the radio communications system is an indoor radio communications system, and
each antenna device is associated with an individual building area.

6. The method as claimed in claim 1, wherein the transmission signals and the reception signals are combined with a common connecting cable.

7. The method as claimed in claim 4, wherein
the radio communications system is an indoor radio communications system, and
each antenna device is associated with an individual building area.

8. The method as claimed in claim 7, wherein the transmission signals and the reception signals are combined with a common connecting cable.

9. A method for finding the position of a subscriber in a radio communications system, comprising:
combining transmission signals from subscribers to form a transmission sum signal, which is passed by cables from a base station to at least two antenna devices for transmission;

combining received signals which are received from respective subscribers via the at least two antenna devices, the received signals being combined to form a received sum signal, which is passed by cables to the base station;

associating each individual antenna device with an individual area for radio communication with subscribers within the area, using different cable lengths for cables of different antenna devices;

determining delay time differences cables for the received signal of a sought subscriber;

determining which antenna device originated the received signal of the sought subscriber based on the delay time differences; and identifying the position of the sought subscriber as the area associated with the antenna device which originated the received signal.

* * * * *